United States Patent
Forster et al.

[11] 3,766,617
[45] Oct. 23, 1973

[54] WORKPIECE LOADER AND UNLOADER

[75] Inventors: Peter E. Forster, Brecksville; John A. Adamcik, Maple Heights, both of Ohio

[73] Assignee: The Motch & Merryweather Machinery Company, Cleveland, Ohio

[22] Filed: Oct. 18, 1971

[21] Appl. No.: 190,173

[52] U.S. Cl. .................... 29/33 P, 29/563, 198/19, 214/1 BC, 408/69
[51] Int. Cl. ............................................ B21d 43/00
[58] Field of Search .................... 29/563, 564, 33 P, 29/568; 408/67, 69, 70, 44, 108, 109; 198/19; 214/1 BB, 1 BC, 1 BH; 90/11 R

[56] References Cited
UNITED STATES PATENTS
3,541,921 11/1970 Helfer et al. .................... 214/1 BC X
3,200,964 8/1965 Eldred .............................. 214/1 BC

*Primary Examiner*—Gil Weidenfeld
*Attorney*—Walter Maky

[57] ABSTRACT
Workpiece loaders and unloaders for use as with a multi-station machining line including a series of machine tools and a workpiece conveyor therealong operative to transport workpieces for loading into the respective machine tools and to receive workpieces unloaded from the respective machine tools for transport to successive machine tools, each workpiece loader and unloader being equipped with a pair of workpiece clamps and being operative upon each 180° indexing of the clamp support structure thereof to transfer a workpiece from the conveyor to the associated machine tool and to transfer a workpiece from the associated machine tool to the conveyor. When the workpieces have been transferred as aforesaid the loader and unloader clamps are opened for chucking of the workpieces in the respective machine tools and for transport of the workpieces on the conveyor to the succeeding work stations.

A characterizing feature of the present workpiece loader and unloader is its simplicity and compactness to minimize the center-to-center distance between the diametrically opposed workpiece clamps thus to minimize inertia forces. The loader and unloader herein is further characterized in that the clamps thereof are hydraulically actuated for rapid opening and closing movements with provision for cushioning such movements to reduce shock load on the equipment.

10 Claims, 3 Drawing Figures

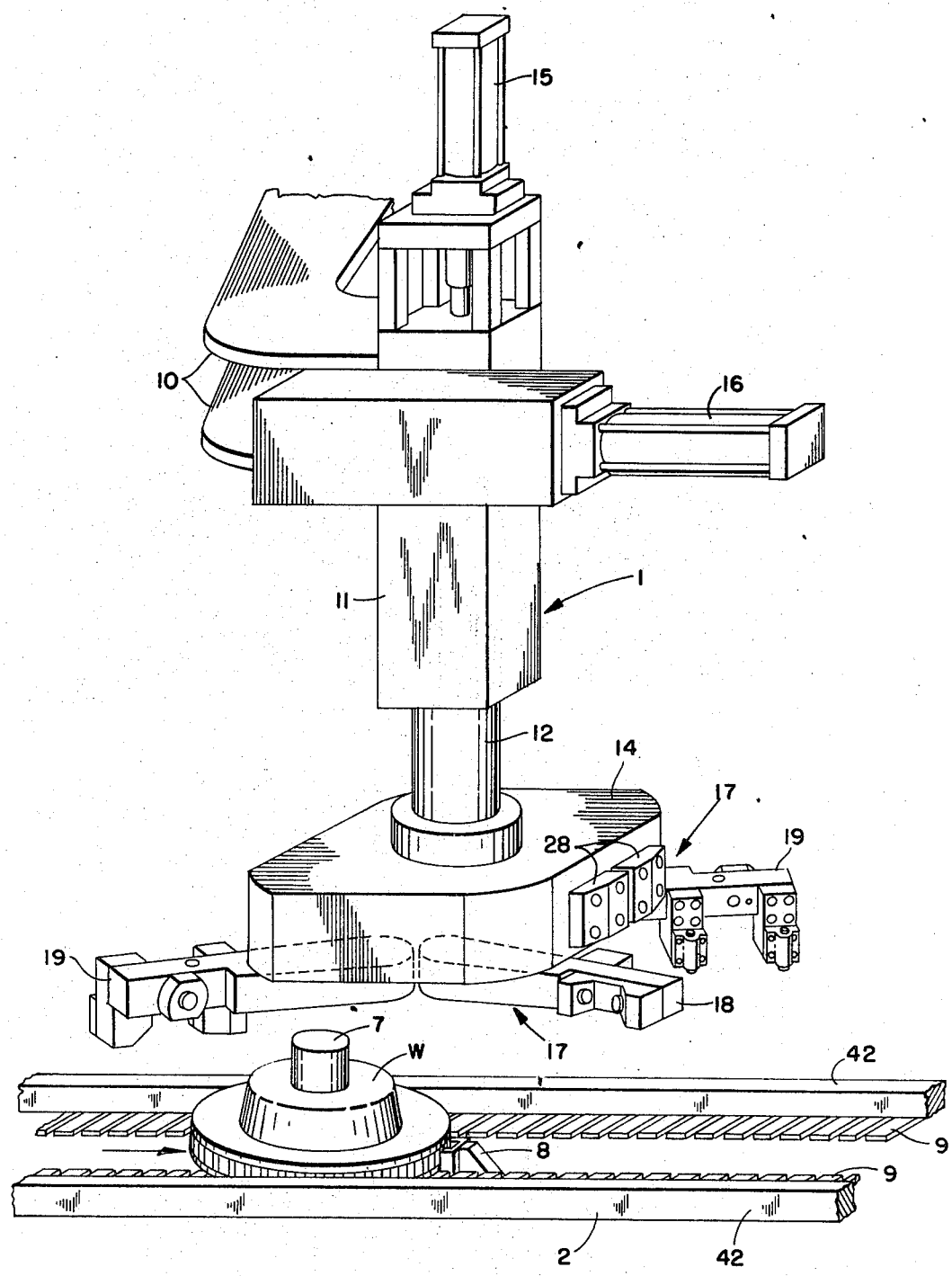

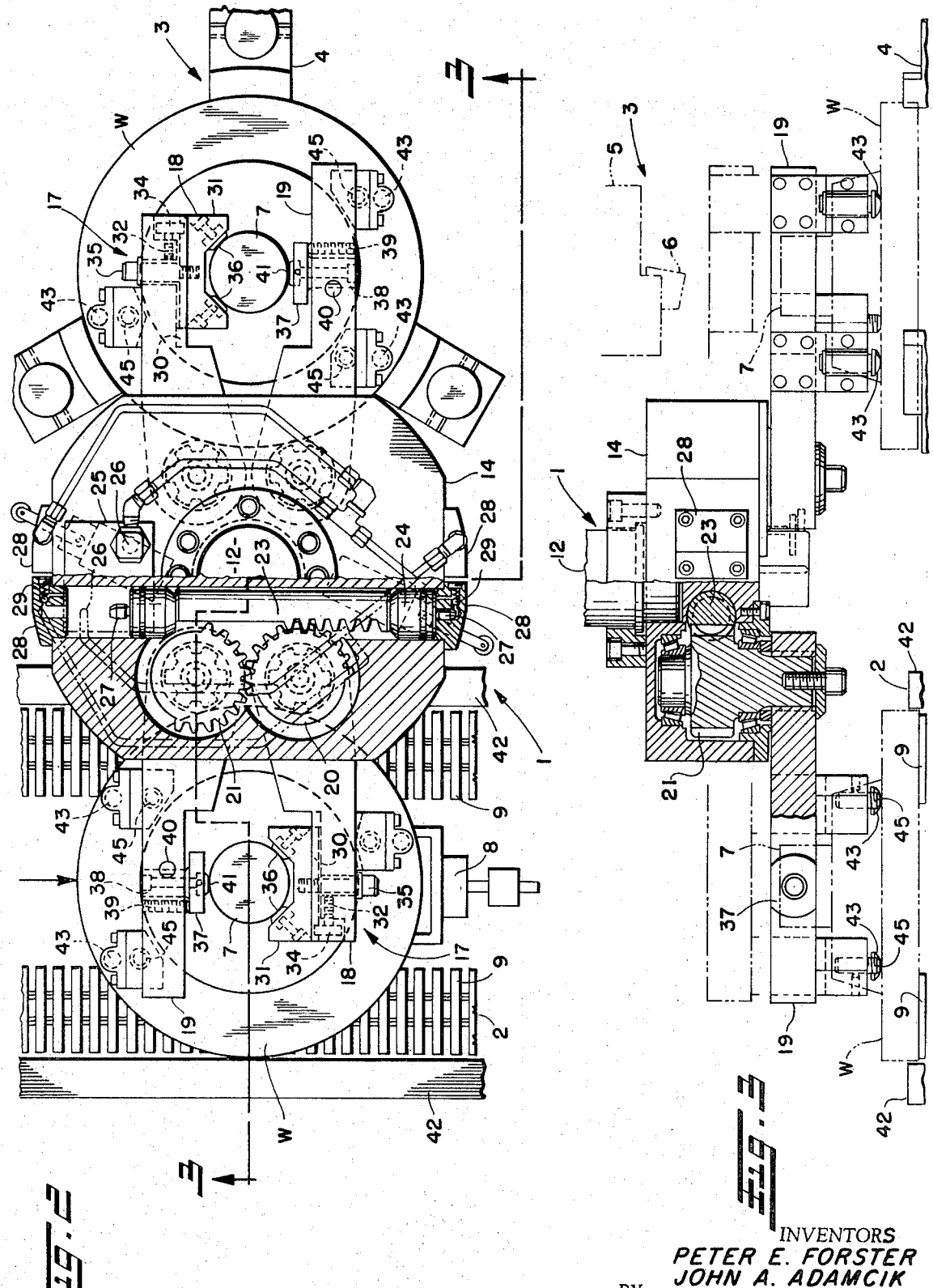

WORKPIECE LOADER AND UNLOADER

BACKGROUND OF THE INVENTION

In the manufacture of workpieces such as discs for disc type brakes, it has been found advantageous to lineally convey the discs to successive positions adjacent a line of machine tools whereat the discs are transferred to the respective machine tools for performance of machining operations thereon. In connection with brake discs or rotors the line of machine tools may comprise 12 stations whereat the following operations are performed in sequence:

STATION NO. 1. Finish turn disc OD. Plunge outer brake face relief groove. Face inner brake face part way for register point on following operations. Rough hub OD, bearing bore and clearance bore.

STATION NO. 2. Rough outer brake face, wheel mounting face and end of hub.

STATION NO. 3. Finish outer brake face (ceramic) and end of hub. Semi-finish wheel mounting face, bearing bore and hub OD.

STATION NO. 4. Part is turned over. Plunge large ID. Rough inner brake face and inner hub face.

STATION NO. 5. Finish inner brake face and inner hub face. Three chamfers. (all ceramic tools).

STATION NO. 6. Finish large ID. Chamfer ID. Rough bearing, seal and clearance bores, and hub OD.

STATION NO. 7. Finish face bearing shoulder and hub OD. Semi-finish bearing bore.

STATION NO. 8. Finish ream bearing and seal bores (stepped reamer).

STATION NO. 9. Part is turned over. Finish wheel mounting face (ceramic), wheel pilot diameter (ceramic) and bearing shoulder. Semi-finish bearing bore.

STATION NO. 10. Drill five stud holes and one process hole.

STATION NO. 11. Ream five stud holes and one bearing bore.

STATION NO. 12. Part is turned over. Spot face and chamfer five stud holes. Turnover, wash and blow-off excess chips.

In the aforesaid machining line for turning, boring and drilling brake discs the various operations are divided so that the machining times at each station are substantially equal and hence it becomes important for increased production to shorten the transfer time of the workpieces from the conveyor line to the machine tool chuck and from the machine tool chuck to the conveyor line.

SUMMARY OF THE INVENTION

A workpiece loader and unloader disposed between a work station and a load-unload station and provided with clamps operative simultaneously to grasp an unfinished workpiece at the load-unload station and a finished workpiece at the work station to transpose said workpieces by 180° rotation of the clamp carrying member; and simultaneously to release the unfinished workpiece at the work station and the finished workpiece at the load-unload station by opening of said clamps, the finished workpiece being moved away from the load-unload station by conveyor means thereat and a succeeding unfinished workpiece being conveyed to said load-unload station while a workpiece is being machined at the work station.

The loader and unloader herein is characterized in that it is of simple, compact, and lightweight construction to reduce inertia loads as it is indexed 180° to transpose finished and unfinished workpieces as aforesaid. Said loader and unloader is further characterized in that the clamps are hydraulically actuated by double acting fluid motors which are disposed alongside one another near the pivot center of the clamp carrying member, the clamp members constituting each clamp being geared together and having gear engagement with its respective actuating piston.

Other objects and advantages of the present invention will appear hereinafter.

BRIEF DESCRIPTION OF THE DRAWING

FIG. 1 is a perspective view of a preferred form of workpiece loader and unloader embodying the present invention;

FIG. 2 is a top plan view partly in horizontal cross-section to show the clamp actuating mechanism; and FIG. 3 is a vertical cross-section view taken substantially along the line 3—3, FIG. 2.

DETAILED DESCRIPTION OF THE DRAWING

The workpiece loader and unloader 1 herein illustrated is one of a series disposed between a workpiece conveyor 2 and a machine tool 3 which comprises a chuck 4 and a slide 5 which carries a cutting tool 6. The workpeice W by way of illustrative example is a disc or rotor for a disc type brake. As apparent from the outline previously given in connection with a 12 station line of machine tools, each machine tool may be equipped with a plurality of reciprocating slides and in most cases the workpiece holding chucks 4 rotate with respect to the cutting tools 6 except as for example, at Stations 10 and 11 whereat the stud holes in the disc are drilled and reamed and as apparent, at those stations the workpiece is held stationary while the drills and reamers are rotated and fed axially with respect to the workpiece. Along the workpiece conveyor 2 there will be provided mechanisms (not shown) for turning the workpiece upside down with the hub 7 downward as at stations 4 to 8, and 12. In the example herein shown, the workpiece W is adapted to be grasped by its hub 7.

The conveyor means 2 herein is preferably of the continuously operating type and at each load-unload station there is provided a stop means 8 which is engaged by the workpiece W as it moves with the conveyor elements 9 to locate the centerline of the hub 7 in alignment with the centerlines of the loader and unloader 1 and the machine tool chuck 4.

When a workpiece W removed from the machine tool 3 is placed on the conveyor 2 the lowering of the stop means 8 will permit movement of the workpiece W to the next load-unload station whereat it is located by movement of the associated stop means 8 into the path of movement of the workpiece W.

The workpiece loader and unloader 1 is mounted on a bracket 10 which may be fixed to the base of the machine tool 3. Said bracket 10 carries a vertical guide member 11 in which the shaft 12 of the clamp carrying head 14 is vertically reciprocated as by means of the fluid motor 15 at the upper end, said shaft 12 being formed with gear teeth meshing with a rack on the piston rod of a horizontally disposed fluid motor 16 which, as apparent, when actuated in opposite directions is operative to rotate the shaft 12 180° in opposite directions.

The head 14 has mounted thereon a pair of clamps 17 each of which comprises a pair of arms 18 and 19 keyed to the shafts of the respective intermeshing gears 20 and 21 of which the gear 20 meshes with a gear rack on the piston rod 23 of a double acting piston 24 which reciprocates in a bore through the head 14. As apparent, when the left-hand piston as shown in FIG. 2 moves upwardly the clamp arms 18 and 19 are swung in opposite directions to open the clamp to release the grip on the hub 7 of the workpiece W so that if the workpiece W has been finished at the work station, the actuation of the stop means 8 will permit the finished workpiece W to be moved downwardly as viewed in FIG. 2 away from that load-unload station, whereupon the stop means 8 will again be positioned in the path of the next workpiece W to position such next workpiece ready for grasping between the arms 18 and 19 when the left-hand piston 24 is moved downwardly as viewed in FIG. 2.

The clamp 17 shown at the right-hand side of FIG. 2 is of the same construction as that just described except that the piston 24 therein moves in the opposite direction, that is, upwardly to cause the clamp arms 18 and 19 to grasp the workpiece W and downwardly to open the clamp 17 to release the workpiece for gripping by the chuck 4. On the head 14 is a distributing block 25 having two ports 26 which are alternately pressure and return ports as controlled by a four-way reversing valve (not shown), the ports 26 being operatively connected with opposite ends of the cylinders in which the pistons 24 reciprocate by means of the piping and fittings as shown in FIG. 2. Each piston 24 has a nose 27 at each end which is a close fit in a bore in the associated end cap 28 whereby as the piston 24 nears the end of its upward or downward stroke such end portion of the stroke is cushioned by reason of restricted flow around the nose 27, the check valve 29 at that time being closed. On the pressure side of the piston 24 oil under pressure acts on the nose 27 and opens the check valve 29 to act on the end face of the piston to effect initial rapid opening or closing movement of the clamps 17 while at the ends of the clamping or unclamping movements the movements of the clamping members 18 and 19 are cushioned by reason of the entering of the nose 27 into the bore of the adjacent cylinder head 28.

Each clamp arm 18 has a radially extending slideway 30 in which a jaw member 31 is adjustably mounted as by a screw 32 which is threadedly engaged in the clamp arm 18 and which has its head 34 engaged in a transverse groove of the jaw member 31. The jaw member 31 is locked to the clamp arm 18 as by means of the screw 35 which has a loose fit in an opening through the arm 18 to permit accurate adjustment of the jaw member 31 so that the axis of the workpiece W engaged by the gripping pads 36 will be at the same distance from the axis of the shaft 12 as the centerline of the chuck 4.

Each clamp arm 19 has a jaw member 37 including a shank portion 38 which is adjusted by manipulating the screw 39 and which is locked in adjusted position as by means of the wedge screw 40 which has a tapered surface of spiral form wedgedly engaging a flat on the shank 38 of said jaw member 37. It is to be noted that by reason of the pivoting of the arms 18 and 19 at spaced apart points as indicated, a slight difference in the diameter of the hub 7 if the hub 7 is machined at the work station as compared with the original hub diameter is of no moment because the jaw movement is essentially in a straight line so as not to cause any noticeable shifting of the workpiece W radially with respect to the axis of the loader and unloader 1. The adjustment of jaw member 37 enables location of the workpiece axis to coincide with the axis of the chuck 4 when the workpiece W is clamped between the pads 36 and 41.

In operation, assuming that the left-hand workpiece W in FIGS. 2 and 3 is an unfinished workpiece engaged with the stop means 8 and that the right-hand workpiece has just been finished and with the loader and unloader 1 in its lowered position with the clamps 17 in open position as shown in FIG. 1, fluid under pressure is admitted to act on the upper and lower ends of the respective left and right pistons 24 to effect closing of both clamps 17 to grasp the hub 7 of the unfinished workpiece W and the hub 7 of the finished workpiece W. At this time, the chuck 4 may be opened, whereupon the actuation of the cylinder 15 will lift the shaft 12 and head 14 and clamps 17 to lift the unfinished workpiece W above the conveyor guides 42 and lift the finished workpiece W out of the chuck 4.

When the head 14 has thus been raised, the cylinder 16 may be actuated to turn the head 14 and shaft 12 180° to position the finished workpiece W in register with the conveyor 2 and the unfinished workpiece W in register with the chuck 4. The cylinder 15 is then actuated to move the head 14 and shaft 12 downwardly to place the finished workpiece W on the conveyor between the guides 42 thereof and to place the unfinished workpiece W into the chuck 4 between the jaws thereof. At that time the loader clamp pressure is turned off and the chuck jaws are actuated to firmly grip the unfinished workpiece. Thereupon, fluid under pressure is admitted to act on the lower and upper ends of the respective left and right pistons 24 to open the clamps 17 so that the machine tool slides 5 may now move to operating position and the stop means 8 may be retracted downwardly to permit movement of the finished workpiece W to the next station, and as soon as the workpiece W passes the stop means 8, the latter is actuated to arrest movement of the succeeding unfinished workpiece W to the position as shown on the left side of FIGS. 2 and 3.

The clamp arms 18 and 19 may be provided with rounded head spring-loaded buttons 43 engaged with the flange of the workpiece W and with adjusting screws 45 spaced above such flange whereby the operation will be stopped if the workpiece W is not properly placed to bottom in the open chuck 4.

We, therefore, particularly point out and distinctly claim as our invention:

1. A workpiece loader and unloader disposed between a load-unload station and a work station, said load-unload station including conveyor means to convey workpieces thereto and therefrom and said work station including a machine tool having chuck means to hold workpieces for machining operations thereon; said loader and unloader comprising a pair of clamp means and actuating means therefor operative selectively to grasp or release workpieces at said stations; indexable clamp support means operative when said clamp means are closed to transfer a workpiece from said load-unload station to said work station and to transfer a workpiece from said work station to said load-unload station; said clamp means, when operated to release said workpieces, releasing a workpiece at the load-unload station for replacement by a succeeding workpiece and releasing a workpiece at said work station for holding by said chuck means and for machining by said machine tool; each of said clamp means comprising a pair of clamp arms movable toward and away from each other about parallel pivots on said support means, and intermeshing gears on said clamp arms coaxial with said pivots; said clamp actuating means comprising a pair of side by side parallel fluid pressure actuated pistons in said support means between the parallel pivots of said pairs of clamp arms; each piston having a gear rack engaging the gear on one clamp arm of the respective pairs of clamp arms to provide synchronized movements of said clamp arms responsive to movement of said pistons.

2. The workpiece loader and unloader of claim 1 wherein said support means is disposed above said conveyor means and said chuck means and is supported for indexing movement about a vertical axis midway between said pair of clamp means and said pistons.

3. The workpiece loader and unloader of claim 2 wherein vertical actuating means is operatively connected to said support means to raise and lower the same respectively to lift the workpiece from said chuck means prior to indexing and to lower the workpiece into said chuck means after indexing.

4. The workpiece loader and unloader of claim 1 wherein one clamp arm of each pair of clamp arms longitudinally adjustably carries a workpiece engaging jaw; and wherein the other clamp arm of each pair of clamp arms laterally adjustably carries a workpiece engaging jaw.

5. The workpiece loader and unloader of claim 1 wherein said conveyor means includes stop means movable into and out of the path of movement of a released workpiece and a succeeding workpiece on said conveyor means whereby, upon movement of said stop means out of the path of said workpieces, said released workpiece and succeeding workpiece are respectively conveyed from said load-unload station and conveyed to said load-unload station, said stop means, when subsequently moved into such path, positioning said succeeding workpiece at said load-unload station and positioning another succeeding workpiece in advance of said load-unload station.

6. The workpiece loader and unloader of claim 3 wherein said clamp means, when operated to release said workpieces, clears the latter for replacement and machining without raising said support means.

7. A workpiece loader and unloader disposed above and midway between a load-unload station and a work station, said load-unload station including conveyor means to convey workpieces thereto and therefrom and said work station including a machine tool having chuck means to hold workpieces for machining operations thereon; said loader and unloader comprising a vertical guide member; clamp support means having a shaft portion rotatable in said vertical guide member about a vertical axis midway between said stations and having a head portion with two pairs of vertical pivots on opposite sides of the axis of rotation of said shaft portion; two pairs of horizontally extending clamp arms pivotally mounted at one end to the respective pairs of pivots for movement of the other ends thereof toward and away from each other to hold and release workpieces therebetween; each pair of clamp arms having intermeshing gears coaxial with said parallel pivots; a pair of side by side horizontal fluid pressure actuated pistons in said head portion between said pairs of pivots having gear racks meshing with one of the gears associated with each pair of clamp arms to provide synchronized movements of said clamp arms responsive to movement of said pistons in opposite directions; indexing means on said vertical guide member engaged with said shaft portion operative when said clamp arms are engaged with workpieces at said stations to transfer a workpiece from said load-unload station to said work station and to transfer a workpiece from said work station to said load-unload station; said clamp arms when operated to release said workpieces, releasing a workpiece at the load-unload station for replacement by a succeeding workpiece and releasing a workpiece at said work station for holding by said chuck means and for machining by said machine tool.

8. The workpiece loader and unloader of claim 7 wherein said conveyor means includes stop means movable into and out of the path of movement of a released workpiece and a succeeding workpiece on said conveyor means whereby, upon movement of said stop means out of the path of said workpieces, said released workpiece and succeeding workpiece are respectively conveyed away from said load-unload station and conveyed to said load-unload station, said stop means, when subsequently moved into such path, positioning said succeeding workpiece at said load-unload station and positioning another succeeding workpiece in advance of said load-unload station.

9. The workpiece loader and unloader of claim 7 wherein said vertical guide member has reciprocating means operatively connected to said shaft portion to raise and lower said head portion and said pairs of clamp arms respectively to lift the workpiece from said chuck means prior to indexing and to lower the workpiece into said chuck means after indexing.

10. The workpiece loader and unloader of claim 9 wherein said pairs of clamp arms, when operated to release said workpieces, clear the latter for replacement and machining without raising said head portion and pairs of clamp arms.

* * * * *